(12) United States Patent
Emami et al.

(10) Patent No.: US 9,358,687 B2
(45) Date of Patent: Jun. 7, 2016

(54) SYSTEM, METHOD AND COMPUTER PROGRAM FOR AUTONOMOUSLY EMULATING ROBOT MANIPULATORS OF CONTINUOUSLY-VARYING CONFIGURATIONS

(71) Applicants: Mohammad Reza Emami, Toronto (CA); Jason Alexander Kereluk, Toronto (CA)

(72) Inventors: Mohammad Reza Emami, Toronto (CA); Jason Alexander Kereluk, Toronto (CA)

( * ) Notice: Subject to any disclaimer, the term of this patent is extended or adjusted under 35 U.S.C. 154(b) by 0 days.

(21) Appl. No.: 13/749,323

(22) Filed: Jan. 24, 2013

(65) Prior Publication Data

US 2014/0222198 A1 Aug. 7, 2014

(51) Int. Cl.
*B25J 9/16* (2006.01)
*B25J 9/08* (2006.01)

(52) U.S. Cl.
CPC *B25J 9/1617* (2013.01); *B25J 9/08* (2013.01); *Y10S 901/14* (2013.01); *Y10S 901/30* (2013.01)

(58) Field of Classification Search
CPC combination set(s) only.
See application file for complete search history.

(56) References Cited

U.S. PATENT DOCUMENTS

| 4,766,775 | A | * | 8/1988 | Hodge | 74/490.01 |
|---|---|---|---|---|---|
| 5,361,186 | A | * | 11/1994 | Tanie et al. | 361/191 |
| 5,428,713 | A | * | 6/1995 | Matsumaru | 700/245 |
| 5,523,662 | A | * | 6/1996 | Goldenberg et al. | 318/568.11 |
| 5,963,712 | A | * | 10/1999 | Fujita et al. | 700/264 |
| 6,084,373 | A | * | 7/2000 | Goldenberg et al. | 318/568.11 |
| 6,233,502 | B1 | * | 5/2001 | Yim | 700/245 |
| 6,233,503 | B1 | * | 5/2001 | Yim et al. | 700/245 |
| 6,243,622 | B1 | * | 6/2001 | Yim et al. | 700/245 |
| 6,459,957 | B1 | * | 10/2002 | Bennett et al. | 700/245 |
| 6,605,914 | B2 | * | 8/2003 | Yim et al. | 318/568.11 |
| 6,636,781 | B1 | * | 10/2003 | Shen et al. | 700/248 |
| 6,725,128 | B2 | * | 4/2004 | Hogg et al. | 700/245 |
| 7,363,109 | B2 | * | 4/2008 | Jiang | 700/245 |
| 8,453,533 | B2 | * | 6/2013 | Ryland et al. | 74/490.05 |
| 8,666,547 | B2 | * | 3/2014 | Cheung et al. | 700/248 |
| 2002/0013675 | A1 | * | 1/2002 | Knoll et al. | 702/150 |
| 2003/0038607 | A1 | * | 2/2003 | Yim et al. | 318/568.11 |
| 2012/0204670 | A1 | * | 8/2012 | Ryland et al. | 74/490.03 |

OTHER PUBLICATIONS

Fitch et al., Experiments with a zigbee wireless communication system for self-reconfigurable modular robots, May 12-17, 2009, IEEE international conference on robotics and automation, pp. 1947-1952.*

(Continued)

*Primary Examiner* — Bhavesh V Amin
(74) *Attorney, Agent, or Firm* — Sim & McBurney (57) ABSTRACT

The invention is a modular and autonomously reconfigurable manipulator system, which introduces a new dimension to the versatility of robot manipulation for diverse tasks. The hardware component is a redundant mechanism which can lock any number of its joints at any relative position to form a particular configuration with a certain number of degrees of freedom and specific values for 5 kinematic, dynamic and control parameters, optimum for a given task to be performed. The process of identifying the optimum configuration for a given task and implementing it on the manipulator is done autonomously through the system software. Therefore, no manual interaction is required to form a new configuration most suitable for a given task. The kinematic, dynamic and control parameters of the system can vary continuously enabling the manipulator to form virtually an infinite number of configurations.

16 Claims, 8 Drawing Sheets

(56) References Cited

OTHER PUBLICATIONS

Homans et al., Telecubes: Mechanical design of a module for self-reconfigurable robotics, May 2002, IEE international conference on robotics and automation, pp. 4095-4101.*
C. Paredis, H. Brown, P. Khosla, "A Rapidly Deployable Manipulator System," Robotics and Automation, IEEE International Conference on, Apr. 1996, pp. 1434-1439.
W. Chen, G. Lang, E. Ho, I. Chen, "Interactive-Motion Control of Modular Reconfigurable Manipulators," Robotics and Automation, IEEE International Conference on, Oct. 2003, pp. 1620-1625.
J. Suh, S. Homans, M. Yim, "Telecubes: Mechanical Design of a Module for Self-Reconfigurable Robotics," Robotics & Automation, IEEE, vol. 4, May 2002, pp. 4095-4101.
D. Rus, M. Vona, "Crystalline Robots: Self-Reconfiguration with Compressible Unit Modules," Autonomous Robots, vol. 10, No. 1, Jan. 2001, pp. 107-124.
M. Yim, W. Shen, B. Salemi, D. Rus, M. Moll, H. Lipson, E. Klavins, G. Chirikjian, "Modular Self-Reconfigurable Robot Systems," Robotics & Automation, IEEE, vol. 14, Issue 1, Mar. 2007, pp. 43-52.

* cited by examiner

| CEBOT | mobile | various | Fukuda et al. | Nagoya | 1988 |
| Polypod | chain | 2 3-D | Yim | Stanford | 1993 |
| Metamorphic | lattice | 3 2-D | Chirikjian | JHU | 1993 |
| Fracta | lattice | 3 2-D | Murata | MEL | 1994 |
| Tetrobot | chain | 1 3-D | Hamlin et al. | RPI | 1996 |
| 3D Fracta | lattice | 6 3-D | Murata et al. | MEL | 1998 |
| Molecule | lattice | 4 3-D | Kotay & Rus | Dartmouth | 1998 |
| CONRO | chain | 2 3-D | Will & Shen | USC/ISI | 1998 |
| PolyBot | chain | 1 3-D | Yim et al. | PARC | 1998 |
| TeleCube | lattice | 6 3-D | Suh et al. | PARC | 1998 |
| Vertical | lattice | 2-D | Hosokawa et al. | Riken | 1998 |
| Crystal | lattice | 4 2-D | Vona & Rus | Dartmouth | 1999 |
| I-Cube | lattice | 3-D | Unsal | CMU | 1999 |
| Pneumatic | lattice | 2-D | Inoue et al. | TiTech | 2002 |
| Uni Rover | mobile | 2 2-D | Hirose et al. | TiTech | 2002 |
| MTRAN II | hybrid | 2 3-D | Murata et al. | AIST | 2002 |
| Atron | lattice | 1 3-D | Stoy et al. | U.S Denmark | 2003 |
| Swarm-bot | mobile | 3 2-D | Mondada et al. | EPFL | 2003 |
| Stochastic 2D | stochastic | 0 2-D | White et al. | Cornell U. | 2004 |
| Superbot | hybrid | 3 3-D | Shen et al. | USC/ISI | 2005 |
| Stochastic 3D | stochastic | 0 3-D | White et al. | Cornell U. | 2005 |
| Catom | lattice | 0 2-D | Goldstein et al. | CMU | 2005 |
| Prog. parts | stochastic | 0 2-D | Klavins | U. Washington | 2005 |
| Molecube | chain | 1 3-D | Zykov et al. | Cornell U. | 2005 |
| YaMoR | chain | 1 2-D | Ijspeert et al | EPFL | 2005 |
| Miche | lattice | 0 3-D | Rus et al. | MIT | 2006 |

SYSTEM, METHOD AND COMPUTER PROGRAM FOR AUTONOMOUSLY EMULATING ROBOT MANIPULATORS OF CONTINUOUSLY-VARYING CONFIGURATIONS

FIELD OF THE INVENTION

The present invention relates to the field of robotic manipulation. The present invention more specifically relates to autonomously identifying and assigning the best configuration of a modular and reconfigurable manipulator for a given task.

BACKGROUND OF THE INVENTION

Robot manipulators (in short manipulators) are popular tools in a large range of industrial fields including manufacturing, assembly and quality control. The primary incentive for manipulators is to be reprogrammable for a variety of tasks. Therefore, they are more versatile than their fixed-automation counterparts in that they are able to switch from one task to another with minimal adjustments. However, conventional manipulators are limited by their mechanical structure to a set range of tasks. The number of the joints, along with their layout would be determined in their design and fabrication based on the range of tasks the manipulator would likely encounter. The number of degrees of freedom (DOF's) for industrial manipulators typically varies from 4-7. Ideally, a manipulator would be chosen to have the number and configuration of joints best suited for their expected range of tasks. However, this is often not the case, as manipulators with custom-configuration are expensive and time-consuming to specify. It is usually the case that the best manipulator configuration from a range of available industrial manipulators is chosen and implemented for a range of tasks. However, even in the ideal case of custom implementation, the manipulator is not optimized for each individual task, but rather for a collection of different tasks. For each individual task, it could have too many or too few joints, and likely have the joints in less-than-optimal configurations. A reconfigurable manipulator can provide a range of configurations, by including or removing joints and changing their relative positioning, which enables the robot to optimally perform a much larger variety of tasks, thus expanding the versatility of the robot manipulator.

In addition to industrial and service applications, a reconfigurable platform for robot manipulators can be greatly helpful for the purpose of design and development as well as research and education. Such a platform can be utilized as a rapid-prototyping means for investigating various configurations for new manipulators and/or control modules. As well, such a platform can be a cost-effective solution for the students and researchers to physically model various robot manipulators and study their performance, as it is often far too expensive to gain access to more than one manipulator for a thorough study or learning experience.

Figure 1:
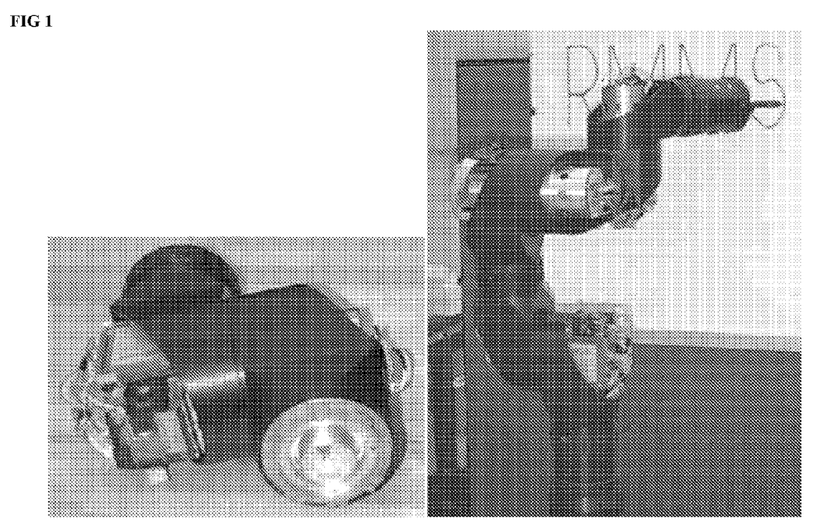
FIG. 1 illustrates a single module and completed manipulator for the RMMS of the prior art.

FIG. 1 shows the Reconfigurable Module Manipulator System (RMMS) from "A Rapidly Deployable Manipulator System" (C. Paredis, H. Brown, P. Khosla, "A Rapidly Deployable Manipulator System," *Robotics and Automation, IEEE International Conference on*, April 1996, pp 1434-1439), which is a manually-reconfigurable serial manipulator with a discrete reconfiguration scheme. By rearranging the modules, the kinematic and dynamic properties of the manipulator can be changed. The RMMS is pneumatically actuated, and is capable of only revolute motion. The modules that make up the manipulator are non-homogenous in size and layout. The configuration shown in FIG. 1 is made up of 6 modules, totalling 4 DOF's.

Figure 2:
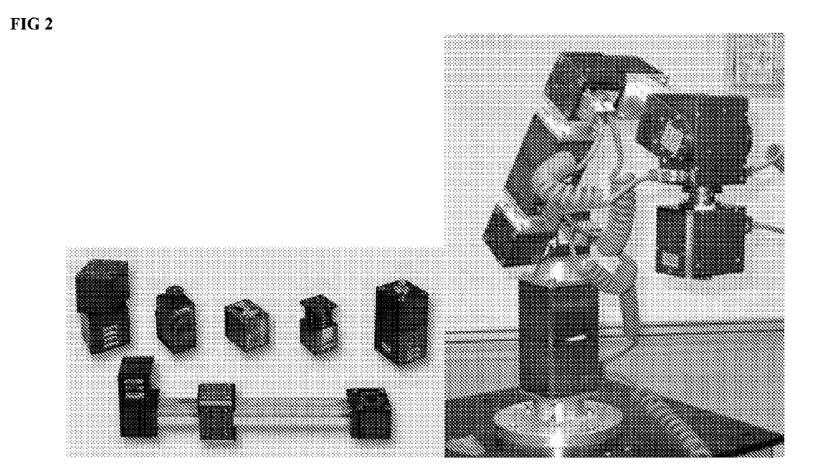
FIG. 2 illustrates a collection of modules and competed manipulator for the prior art.

A second reconfigurable serial manipulator system, shown in FIG. 2, from "Interactive-Motion Control of Modular Reconfigurable Manipulators" (W. Chen, G. Lang, E. Ho, I. Chen, "Interactive-Motion Control of Modular Reconfigurable Manipulators," *Robotics and Automation, IEEE International Conference on*, October 2003, pp. 1620-1625), is capable of both serial and branched (two or more end-effectors) configurations. This manipulator is also discreetly reconfigurable, via a set of 1-2-DOF non-homogeneous modules. The modules are capable of either revolute or prismatic motion, allowing the system to assume configuration with prismatic joints. The manipulator is manually reconfigured by a human operator.

Another type of modular reconfigurable serial manipulator, from "Modular, Expandable And Reconfigurable Robot" (A. Goldenberg, N. Kircanski, P. Kuzan, J. Wiercienski, R. Hui, C. Zhou, "Modular, Expandable And Reconfigurable Robot", USPTO #5523662, Jun. 4, 1996) is a collection of 1-DOF modules of revolute actuation that can be assembled into various configurations. This manipulator uses brushless DC motors through harmonic drive gearing, and is manually reconfigurable. Reconfiguration requires complete or near complete disassembly of the manipulator.

Another type of robot relevant to this patent is the self-reconfigurable robot. These robots are often modular assemblies that are able to reconfigure their kinematics either manually or autonomously.

Figure 3:
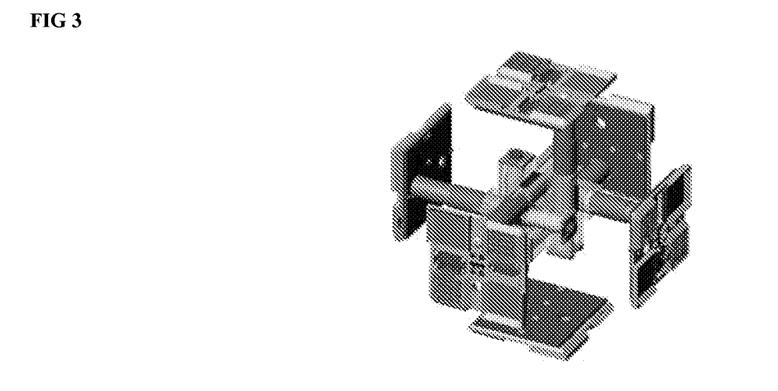
FIG. 3 illustrates a telecube module of the prior art.

In "*Telecubes*: Mechanical Design of a Module for Self-Reconfigurable Robotics" (J. Suh, S. Homans, M. Yim, "*Telecubes*: Mechanical Design of a Module for Self-Reconfigurable Robotics," *Robotics & Automation, IEEE*, Vol 4, May 2002, pp. 4095-4101.), a robot call Telecubes is presented, shown in FIG. 3. The Telecubes robot is a collection of 3-DOF modules that have orthogonal prismatic motion. Modules are able to autonomously link and un-link from each other to create new configurations.

Figure 4:
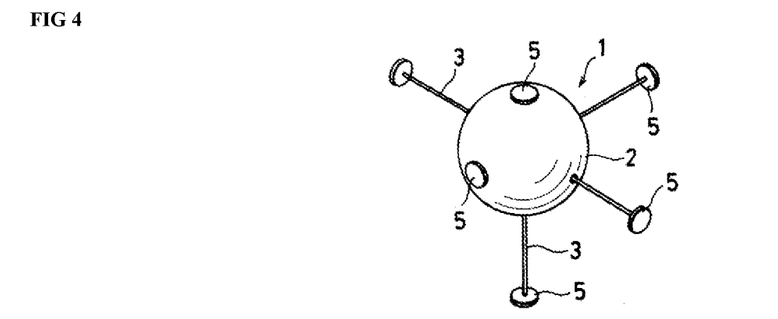
FIG. 4 illustrates a cellular robot module of the prior art.

Similar to the Telecube robot is the robot presented in "Self Reconfigurable Cellular Robotic System" K. Tanie, H. Maekawa, "Self Reconfigurable Cellular Robotic System", USPTO #5361186, Nov. 1, 1994. It is also constructed from 3-DOF modules of orthogonal prismatic motion, shown in FIG. 4. Unlike the Telecube, the cellular robot retracts one side while it extends on the other side. The Telecube retracts and extends both sides at the same time. The Cellular robot is also able to autonomously change its configuration.

Figure 5:
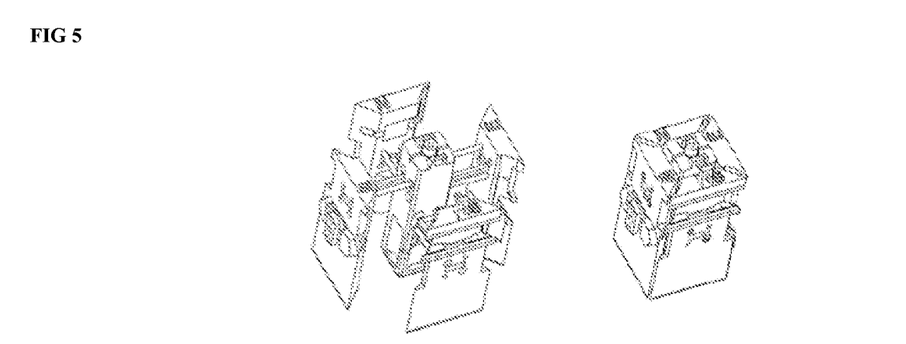
FIG. 5 illustrates a Crystalline Robot module of the prior art.

The Crystalline Robot, shown in FIG. 5, and described in "Crystalline Robots: Self-Reconfiguration with Compressible Unit Modules" (D. Rus, M. Vona, "Crystalline Robots: Self-Reconfiguration with Compressible Unit Modules," *Autonomous Robots*, Vol 10, Number 1, January 2001, pp. 107-124) is a 1-DOF representation of a prismatic self-reconfigurable robot. This robot is also capable of autonomous reconfiguration of its modules, through automatic linking and un-linking of modules.

Figure 6:
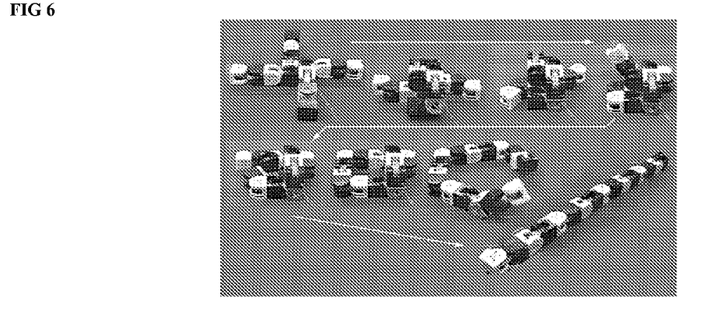
FIG. 6 illustrates the MTRAN robot of the prior art.
Figure 7:
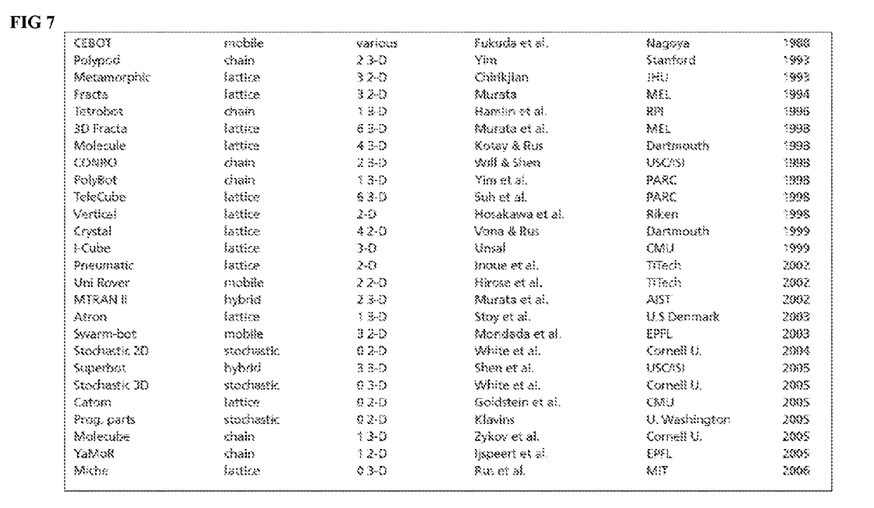
FIG. 7 is a table of all reconfigurable robots of the last 3 decades from the prior art.

The M-TRAN Robot, shown in FIG. 6 and described in "Modular Self-Reconfigurable Robot Systems" (M. Yim, W. Shen, B. Salemi, D. Rus, M. Moll, H. Lipson, E. Klavins, G. Chirikjian, "Modular Self-Reconfigurable Robot Systems," *Robotics & Automation, IEEE, Vol* 14, Issue 1, March 2007, pp. 43-52) is a self-reconfigurable robot that is capable of revolute motion instead of prismatic. Each robotic module has 2-DOF, and is capable of autonomous reconfiguration. It should be noted that "Modular Self-reconfigurable Robot Systems" also describes several other self-reconfigurable robots similar to the ones previously mentioned. One common shortcoming in all of them is the inability to lift more than a few modules in weight. A list of similar robots is present in FIG. 7.

SUMMARY OF THE INVENTION

The present invention is a modular robotic manipulation system which has the capability of autonomously changing its kinematic, dynamic and control parameters in a continuous range. The three main advantages of this manipulator system over other reconfigurable manipulators are the modularity, autonomy and continuous reconfigurability.

In a reconfigurable manipulator system, the attribute of being modular allows for quick and easy addition, subtraction or replacement of components, be they mechanical, electrical or software components. This gives two major benefits to such a system. The first lies in the area of maintenance and repair. When a hardware component fails or breaks on a modular device, such that operation of the device cannot continue, it is a simple matter to swap in a replacement module to restore functionality to the entire system. Then, the broken components in the old module can be repaired or replaced at leisure, while the system can still operate. The alternative to this is to have the entire system suffer significant down-time while the defective part is diagnosed, removed and replaced. The second area for benefit of a modular system lies in expandability. Modules are, by design, interchangeable. This allows new functionality to be implemented on the system with the addition, subtraction or reorder of one or more modules.

Autonomy is perhaps the greatest advantage of the proposed invention. To be autonomous, the system must be able to perform a complete task without external instructions or interaction, with the exception of the instruction to begin the task. The existing reconfigurable manipulators are not capable of autonomy in their reconfiguration stage. This stage has two distinct phases: the identification of the desired configuration and the physical implementation of that configuration. The first phase requires the assignment of the links and joints and their relative positioning in which the manipulator is to adopt. The desired configuration is often chosen by a human operator. While the proposed manipulator system does allow a human operator to directly input a desired configuration, a key innovation of the system is the ability to autonomously assign the best configuration for a given task that the manipulator is asked to perform. The second phase of the reconfiguration stage requires the manipulator to reconfigure itself in the desired configuration. This is also done by a human operation in the existing reconfigurable manipulators. The proposed manipulator system, however, needs no human interaction whatsoever to accomplish this phase. It is able to change its configuration, by changing its kinematic, dynamic and control parameters, to the desired configuration autonomously, through the utilization and systematic locking and unlocking of its joints. Because of its autonomy, the proposed manipulator system can change its configuration far more rapidly than any other reconfigurable serial manipulator, both in computing the new configuration, and in physically changing the configuration. Further, the system can be programmed to run experiments automatically which require multiple configurations—something that has, so far, only been possible in simulations.

Having continuous variation of system parameters is an asset for a reconfigurable system. The goal of any reconfigurable manipulator is to allow for a multitude of different configurations to be realized on a single platform. There are two categories for such a reconfigurable manipulator: discretely reconfigurable, and continuously reconfigurable. A discretely-reconfigurable manipulator has a finite number of configurations, often achieved through a collection of components that can be assembled in different ways. This greatly limits the system reconfigurability. A continuously-reconfigurable manipulator can have an infinite number of configurations, which makes the task of finding an optimum solution in the configuration space more tractable. It also allows for analytic study of the rate of change of manipulator performance metrics with respect to each of the system parameters.

DETAILED DESCRIPTION

Figure 8:
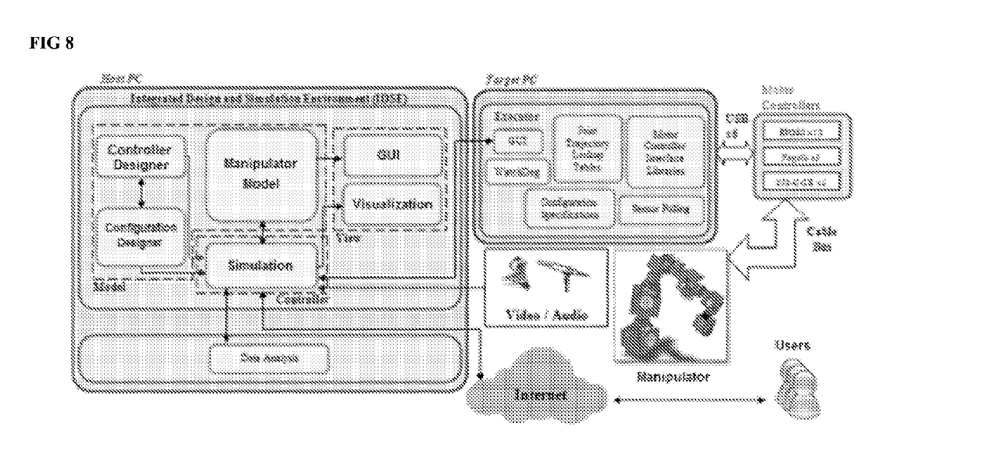
FIG. 8 illustrates the mechatronic system organization of the invention.

The proposed manipulator system is made up of two components: a reconfigurable manipulator (hereby referred to as the manipulator), and the software (hereby referred to as the Integrated Design and Simulation Environment or IDSE). These two components are connected through a series of controllers as shown in FIG. 8. The manipulator is the physical apparatus with which manipulation tasks are performed. The IDSE is the software that computes the optimum configuration of the manipulator for a given task, in terms of its DOF's, kinematic, dynamic and control parameters, and implements it on the physical manipulator. It also allows the end-user to analyze and synthesize various configurations and conduct virtual-reality simulations of system performance, and/or choose a specific configuration and directly operate the manipulator.

Reconfigurable Manipulator Component

Figure 9:
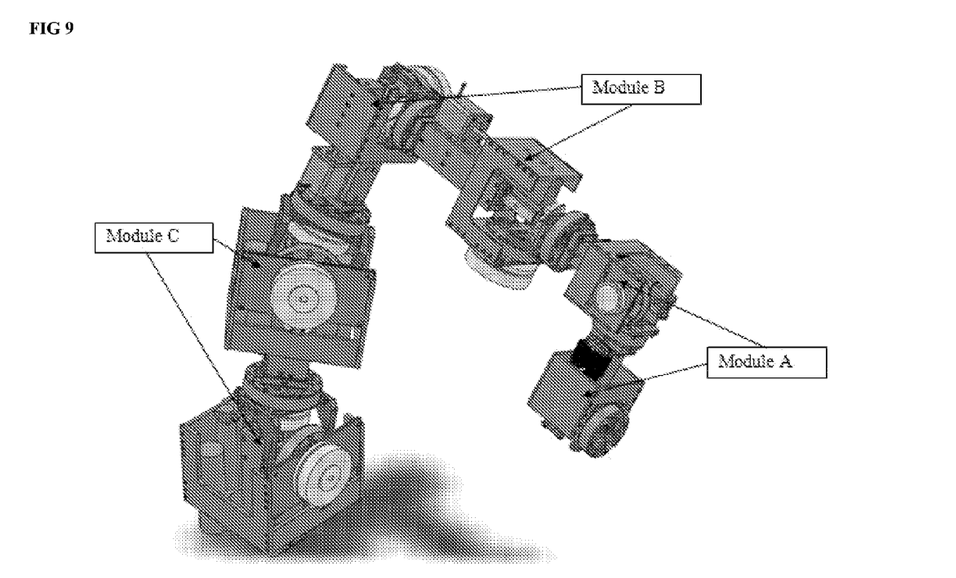
FIG. 9 illustrates the completed manipulator hardware.
Figure 10:
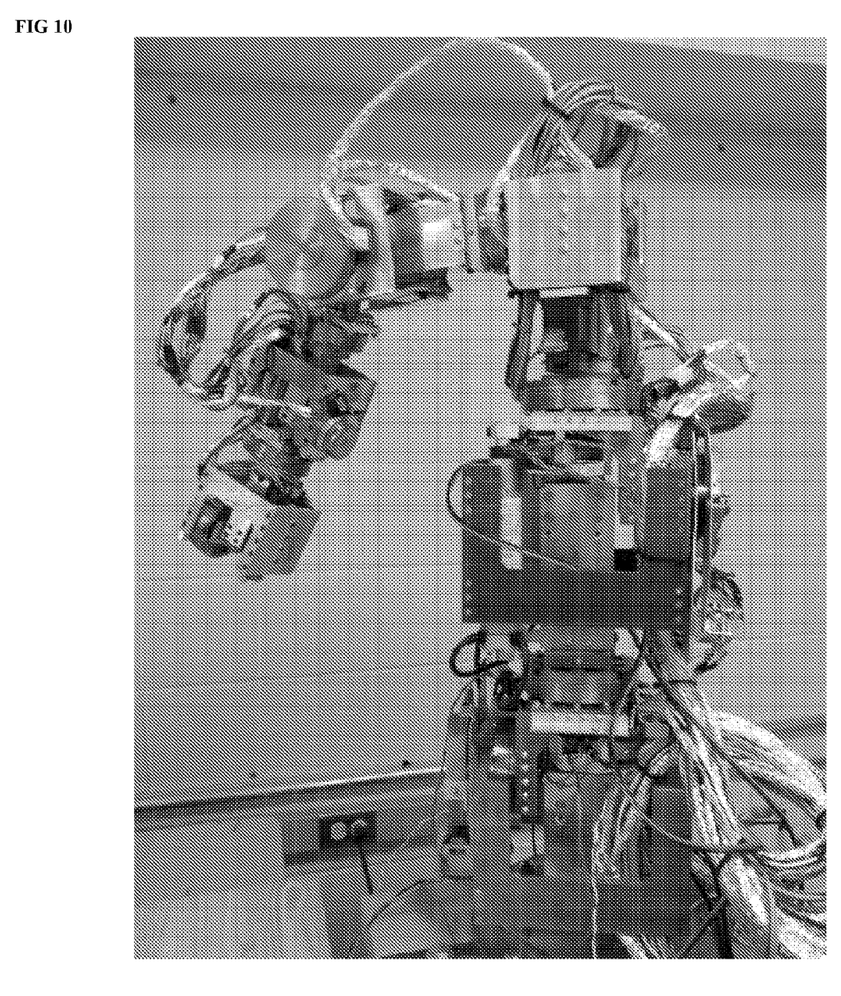
FIG. 10 is a photo of the completed manipulator hardware.

The manipulator is made up of several modules of 3-DOF each, shown in FIG. 9. There are three different sizes of modules, each with a homogenous layout which consists of a prismatic joint followed by two revolute joints perpendicular to each other. The largest modules (type C) reside at the base of the manipulator, followed by modules of a size smaller (type B), and finally the smallest modules (type A) at the end of the manipulator. This cascading module size arrangement allows for more powerful modules to reside at the base of the manipulator and lighter modules to reside at the end of the manipulator.

The goal of the manipulator is to physically reconfigure itself into manipulators of lesser DOF's to either emulate the existing serial manipulators or to optimize itself for a specific task. It is able to do this by changing its joint positions and then locking specific joints such that the resulting manipulator forms the desirable kinematic and dynamic parameters. Once the configuration is set, only a subset of all the joints will be actuated. However, since this subset is unknown until the configuration is assigned by the software, each joint must have the capabilities of an unlocked DOF in a target configuration.

Figure 11:
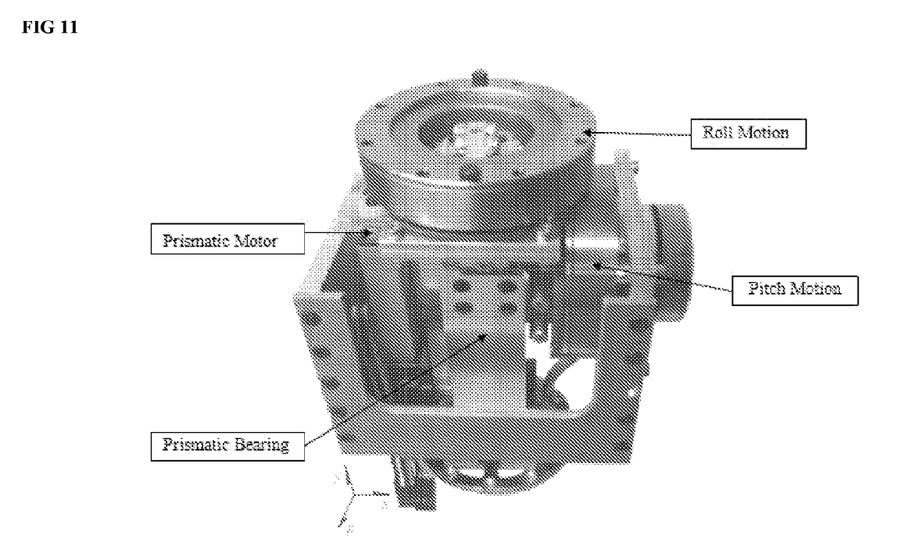
FIG. 11 illustrates a single manipulator module
Figure 12:
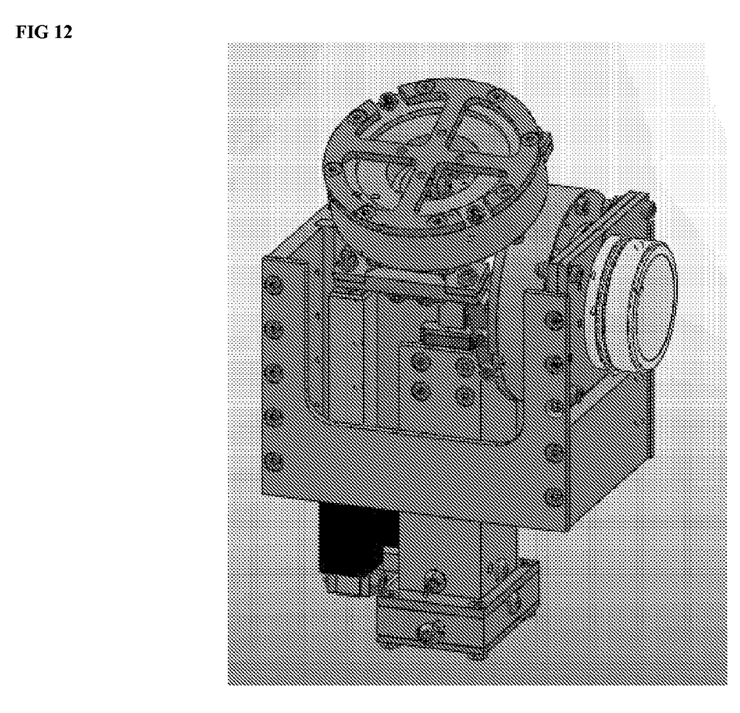
FIG. 12 CAD model of a single manipulator module

The kinematic layout of each module, shown in FIG. 11, is designed to eventually provide maximum versatility in the overall manipulator. The last two DOF's of each module is a pitch revolute joint followed by a roll revolute joint (R⊥R). This serves two purposes. First, many manipulators have a kinematic wrist located at the end of the manipulator. This wrist is usually either roll-pitch-roll, or just pitch-roll. By having this joint layout built into the modules, having this wrist kinematics directly before or near the end-effector would be simple. Further, such a wrist kinematics allows for any orientation of the module following the wrist. By having the capability of this wrist throughout the manipulator, a wide array of configurations can be achieved. The first DOF of each module is a prismatic joint perpendicular to the pitch joint, making the joint layout for each module P⊥R⊥R. Having the first DOF in the module as a prismatic joint allows for a continuous variation of link lengths. Without a linear motion capability, link lengths would be fixed to combinations of unchanging module lengths, which would drastically reduce the effectiveness of the possible configurations that the manipulator can assume. Each module is connected to the previous one so that the kinematic layout for the complete manipulator is (P⊥R⊥R‖P⊥R⊥R‖ . . . ‖P⊥R⊥P). Finally, the orientation of the three joints with respect to each other, plus the orientation of each module with respect to the adjacent modules, is chosen such that it would be easy to have two prismatic joints in two adjoining modules in parallel. This would allow twice the prismatic joint motion for a manipulator, as well as a significant increase in speed for prismatic motion.

The actuator and structural requirements for this robot are to be able to lift the weight of the robot in the vast majority of configurations, as well as to take the forces due to inertia when the robot moves at speed through a large array of configurations. Further, it is able to accomplish both of the above requirements with the addition of a 1 kg mass located 10 cm beyond the final module: this is to represent an end-effector or other types of payload.

The rotary motion for this robot is provided by brushless DC-motors acting through 100:1 reduction harmonic drives. Traditionally, brushless motors are chosen because of their long life span and low friction. While these attributes are beneficial to the robot, the main reason for choosing these brushless motors is their high power-to-weight ratio. Further, these particular motors have a short length along their axis of rotation—a key asset for having 3-DOF in a single module. The harmonic drive transmission system, allows for a higher torque along with zero-backlash capabilities; these are the standard advantages of harmonic drives. However, a further attribute is their low weight, and small length along the axis of rotation, important for the same reasons as with the brushless motors.

The linear motion is provided by lead-screw mechanisms. The mechanisms vary between different sizes of modules. Near the base, there are high-force, medium-speed actuators, capable of moving the entire robot at reasonable speeds. The first type C module (at the base of the robot) will always have its linear motion in the vertical direction, which is rarely needed at the base of a manipulator. Therefore, this first type C module does not require high-speed linear motion. The second type C module can achieve higher speeds with the same actuator as it has less mass to move. If, in a rare case, a configuration needs high vertical speed in the first joint, the first two type-C modules can combine their linear motion for a high speed joint. The type-B linear motions are often required for manipulator configurations, and are therefore high-speed, medium-force custom lead-screws. Type A has lower force requirements due to its small mass it has to move, and the unlikelihood that a useful configuration will require linear motion so close to the end-effector. Therefore, the speed is slightly less for linear type-A motion, to keep the mass of the module as low as possible to allow higher speed in the preceding modules. In case of type A requiring high speeds, it can have two actuators act in parallel for one motion, similar to type C.

The motion of the modules is supported by a system of bearings in each module. The rotary motion is supported by a cross-roller bearing integrated into the harmonic drive unit, allowing for a compact design and minimizing the off-axis force on the brushless DC-motors. The linear motion is supported by two linear rails located next to the linear actuator. While it is better to have the linear rails lie between the two linear actuators (in the case of type A and C), instead of beside them, this would have increased the size, and therefore mass, of the modules. As the linear guides are able to accommodate for the increased moments that this offset induces, it was deemed superior to have the rails located near, but not in-between, the actuators.

Figure 13:
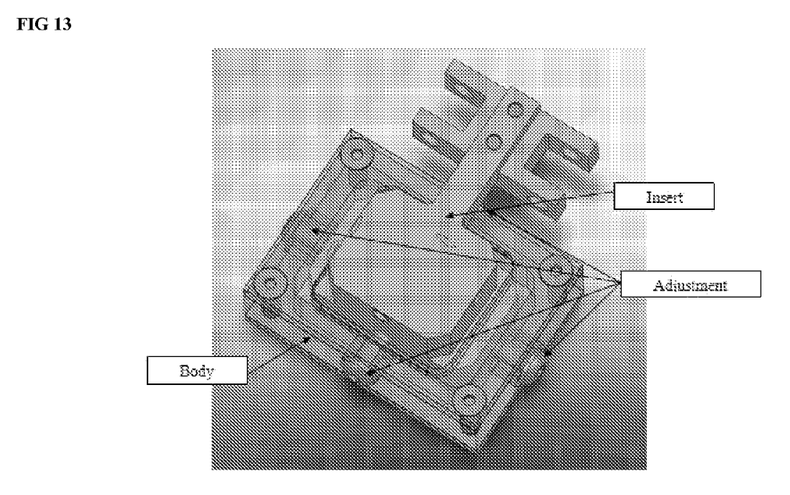
FIG. 13 illustrates the coupler adjustment stage between each module

At the base of each module is a coupler. This coupler has two functions: first, to joint two adjacent modules together, and secondly to allow for position adjustments between the two modules. The layout of the module was chosen such that it would be easy to have two prismatic or even two roll motors in parallel. However, because of machining tolerances, when the modules are assembled, the axes of these DOF's will be slightly out of alignment. The coupler (Appendix A1-4) is mounted to the pervious module through its body (the bottom, main and top) and to the next module through the adjustment stage (called the insert). The coupler insert is held in place along the vertical axis via the top and bottom of the body. Along the other two axes, the insert is held by four screws, shown in FIG. 13. These screws allow for very small adjustments in the position of the insert, thus the position of the next module with respect to the previous one. The reason why two screws were used for each axis instead of one is that, if a single screw is used, it can loosen or have backlash between its threads. By having two screws, producing force in opposing directions, they keep each-other tight and free of backlash.

Figure 14:
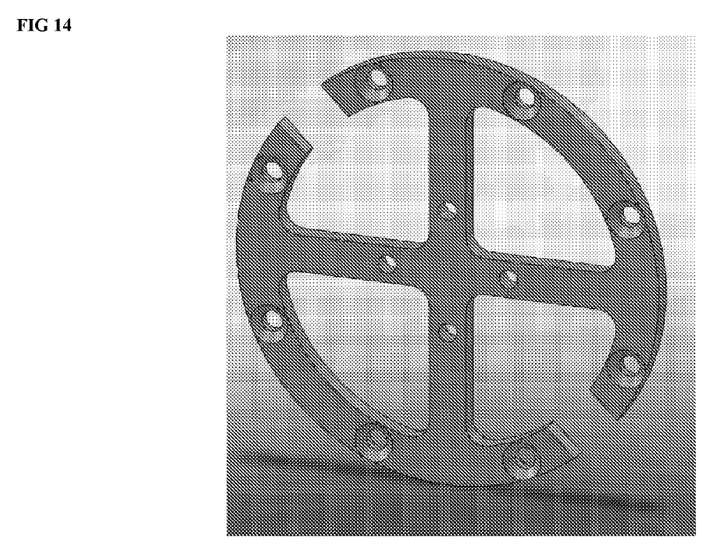
FIG. 14 illustrates the cross for torque sensing on each rotary joint

Each module is capable of sensing the position and force/torque of each of its 3-DOF. The rotary position is achieved through Hall-effect sensors attached to rotary motors. These sensors can detect a change in position of a fairly coarse margin: between 5 and 15 degrees (depending on the module in question). However, the position of relevance is the position after the gear ratio. Once the 100:1 speed reduction is taken into account, the rotary position feedback is less than 0.15°. The linear position feedback method is different in each module. For type A and C, it is achieved through a potentiometer on the linear actuator. This is sufficient for the linear motion of type A and C, but not for type B. Type B employs a stepper motor (A and C are DC motors) which through step-counting gives some position feedback. However, to greatly augment this, an encoder is installed on the motor, allowing for very precise position, and therefore velocity and acceleration feedback. Force feedback is accomplished by a small cantilever beam in each module which bears 100% of the linear force. For type A and C, this beam is on the coupler insert (Appendix A2) and for type B, it is the Linear Actuator Motor Mount (Appendix A6). A strain gauge on these beams can measure the amount of deflection, and translate that very accurately into the force experienced by the linear actuator. A similar technique is employed for the torque in the rotary actuators. A cross composed of four beams (FIG. 14 and Appendix A5) is attached to each harmonic drive through the outer mounting holes, while the load on the motor is applied to the inner mounting holes. By applying strain gauges to each of the four beams, the force in each beam can be measured, and this can be translated into the torque applied to each rotary motor.

Figure 15:
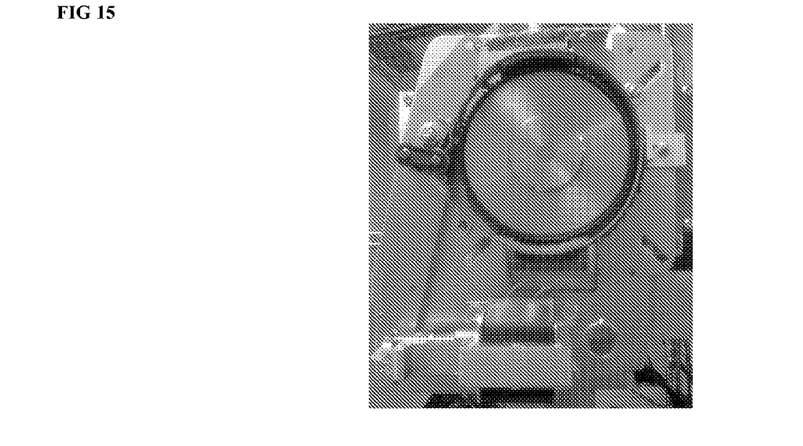
FIG. 15 illustrates the type C pitch band brake

Each DOF must have the capability of holding its position statically, i.e., locking. The smaller joints at the end of the arm are able to do this by applying a holding torque to the motor. The larger joints near the base, however, will not be able to effectively hold their position with the motor alone. The linear joints at the base are, by design, non-back-driveable, which means that even with no power, they can hold their static position. The rotary motors, however, require an external locking mechanism. Such a mechanism is applied to all type C rotary motors. There are two types of locking mechanisms in the manipulator: one for the pitch motors, and one for the roll motors. Both the roll and pitch motors have external rotors, which rotate with the shaft. The locking mechanisms use a belt press-fitted to the external rotor which has teeth that mesh with a locking solenoid. The pitch motor lock, shown in FIG. 15, uses a single solenoid to activate a band-break, engaging and disengaging the teeth on the fitted belt. The band-break is normally on, which means when the power is off the lock is engaged. The band-break mechanism is designed such that the radial breaking force is not aligned with the solenoid, therefore making the break non-back-drivable.

Figure 16:
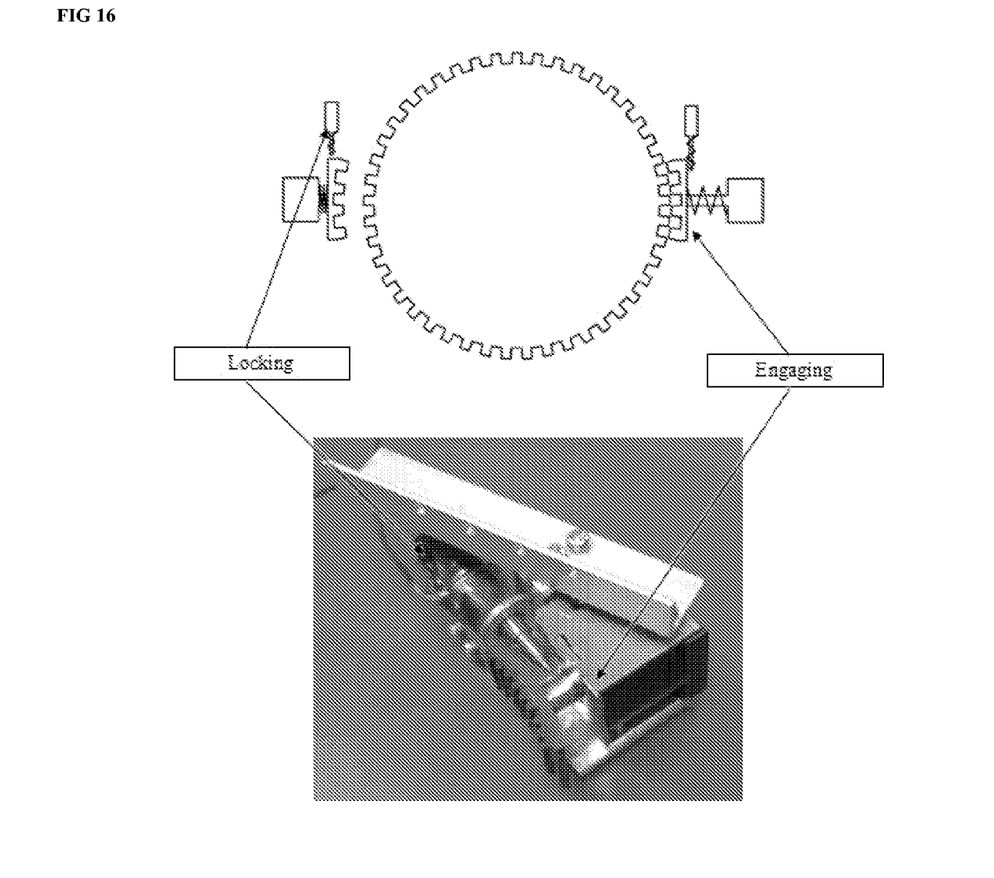
FIG. 16 illustrates the type C roll solenoid brake

The roll motor cannot accommodate a band-break mechanism due to space restrictions. Instead, it uses four solenoids in its place. Two solenoids will engage the teeth on the external rotor, locking the motor in place. The second pair of solenoids will prevent the first two solenoids from moving from the applied spring force when off, and the applied motor for when they are on. A pair of solenoids in a roll-locking mechanism is shown in FIG. 16. The solenoid on the right is in the locked state, while the one on the left is in the un-locked state. Note that this will never be the case during the operation, both will always be in the same state; this figure shows the contrary for purposes of illustrating the two states on one diagram.

Software Component

The architecture of the IDSE has the format of model-view-controller (MVC) running on a host PC that connects to a separate PC, called the target, which runs an executor module, shown in FIG. 8. The Controller of the host PC governs the executor module on the target PC, which in turn directly controls the hardware. The Model of the host PC sits atop an independent analysis tool, such as MATLAB®, outside the MVC architecture which allows for data analysis.

One of the key features of the IDSE is the reconfiguration feature, which is made up of elements of the Model. The reconfiguration feature finds the optimum configuration for the manipulator. First, it contains a database of premade configurations with attributes that aid the user in selecting them. This database can be updated by the user as new configurations are developed. The main portion of this module, however, is a configuration optimizer, which takes the task and design criteria as an input and generates a custom configuration optimized for the specific task.

The configuration optimizer accepts a task from the user, along with some design criteria, and determines an optimal configuration for that specific type of task. The design criteria include the desired end-effector twist, end-effector force, accuracy, compliance, controllability, etc. The optimization problem can be solved using generic optimization techniques and tools, including Simulink® Control Design and Design Optimization toolboxes. Alternatively, a custom optimization technique can be adopted through the following five steps:

1) A configuration manifold is constructed. The configuration manifold is an abstract representation of every possible position that the manipulator can assume.
2) The configuration manifold is discritized into a large number of points.
3) The discrete configuration manifold is clustered into attractive and repelling regions ranked based on the available design criteria.
4) The ranking of the regions is modified based on the importance weight that the user assigns for each of the design criteria.
5) The task-optimal manipulator configuration is formed by finding a trajectory through regions in the configuration manifold, which is the closest to attractive regions and farthest from the repelling regions. The points that such an optimal trajectory consists of in the abstract configuration manifold translate into the manipulator joint positions and locking scheme.

Steps 1-3 are performed offline and only once. They are computationally intensive, and as such are too expensive to perform while the user is waiting for a target configuration to be generated. Steps 4-5 are the only steps performed more than once, once for every configuration to be generated for each given task. The separation of online and offline steps allows for a detailed configuration model to be generated over a long period of time a priori, and then the detailed configuration model is utilized by the user to rapidly generate a task-optimal configuration.

To complement the reconfiguration feature, the Model also has a simulation environment. There are three purposes to this simulation. The first is to ensure that no commands are sent to the manipulator that damages the manipulator. There is a clear workspace around the manipulator that prevents it from harming people or the environment around it. People and objects need only to remain clear of the workspace. The manipulator itself, however, exists inside the workspace, and it is capable of self-collision. In addition, the manipulator is capable of performing certain actions and motions that can damage itself in absence of self-collisions; for example, positioning the centre of mass in such a way that the acceleration of one of the joints causes an extreme stress on one or more component(s). These situations are difficult to predict mathematically, however, can be shown through the simulation. The second purpose of the simulation is to provide more rapid feedback on the capabilities of the current configuration. As one of the primary uses of this software is to develop new manipulator configurations, having a simulation in addition to a physical apparatus to provide data about the new configurations will aid the designer in their efforts. This can be thought of as a rapid-prototyping tool for new configurations. The third purpose for the simulation is as a tool for calculating the required joint torque/forces needed for a desired motion.

The View of the MVC architecture is the Graphical User Interface (GUI) and associated interfacing functions of the software. Primarily, the View is made up of several types of displays that the user can interact with. These displays include the ability to view sensor data, joint positions and velocities, virtual-reality performance, etc. The View is customizable to enable the user to only see information that is relevant to their current operation.

The Controller of the MVC architecture is the communication manager of the host machine. Its responsibilities are to ensure that data is passed to and from the View, Model and target PC in a clean and efficient manner. Its function deals with controlling the joints of the manipulator during runtime, as well as sending commands from the Model to the executer module to govern the signals sent to the motors. Further, it also sends along information from the simulator so any undesirable moves can be avoided. The manipulator controller function also takes information from the target PC and sends it to the View to be displayed (such as sensor readings) and to the Model to be processed to influence future moves.

The host PC and the target PC run on two separate platforms. Because the target is a dedicated low-level controller, the PC for the target does not have to be advanced, as the processing demands are minimal. The host PC, however, requires more computational power, and is therefore a more advance computer. It is connected to an internet connection and, along with a series of webcams and microphones on the set up, allow users to log in to view and interact with the manipulator remotely. Because of this, the end-user can access the entire manipulator platform from any computer in the world with an internet connection and a few basic plugins. This is a further advantage to the research and educational aspect of the platform as researchers and students do not have to be in physical contact with the setup to perform experiments or gain experience with the system.

There are three distinct advantages in separating the hardware into a low-level control, real-time kernel and a second processor running high-level functions. First, only the host machine needs to be upgraded regularly as new simulation and analysis tools emerge. The target machine does not need to be upgraded as software for direct manipulator operation does not advance at the same rate, and is less computationally intensive. The second advantage is that it decouples the processing to a greater degree than even multi-core processors in that, for example, if the simulation or data analysis is too intense computationally, the low-level manipulator controller remains unaffected, and will not experience any lag. This helps protect the physical manipulator from damage, as well as the integrity of the data collected. The third advantage of separating the two machines is that, with any constantly upgraded system, there is inherent risk of system instability or failure, due to new hardware compatibility or new software bugs. It is for this reason that the target machine has a "Watch Dog" module to prevent undesirable operations. The host machine is accessible by remote users through the internet, as will be discussed in the next section.

The executer module is the low-level controller for the manipulator, which is designed to work by itself or in conjunction with the host machine. Within the executer module there are a number of functions that allow for effective control of the manipulator. The first function is a Watch Dog function, which protects the manipulator form actions that can harm itself or the environment. This function is particularly important because of the remote accessibility of the system. The next function is the joint trajectory lookup tables, which contain information on how the joints are to be actuated for the current task. This allows for fast response times of the manipulator, and is standard practice for robot manipulators. The motor controller interface libraries allow the target to send and receive motor signals, sensor information, and other functions unique to each joint, such as locking and status signals. These libraries are used by the sensor polling function, which is constantly monitoring various sensors of the manipulator, and passing them to the controller of the host, when the host is involved. Finally, the configuration specification holds information on which configuration is currently being used, so the correct joints can be locked in the correct position on the robot.

The invention claimed is:

1. A manipulator system comprising:
a robotic reconfigurable manipulator capable of changing its kinematic, dynamic and control parameters continuously, the robotic reconfigurable manipulator comprising:
one or more modules, one of said modules configured to connect to a stationary structure and one of said modules configured to connect to an end effector, each module fixedly connected to one or two adjacent modules and configured to connect to no more than two adjacent modules,
wherein each module comprises a prismatic joint, and two revolute joints, each joint configurable through a continuous range and configured to enable adjustment between adjacent modules, and
at least one processor and memory, the at least one processor and the memory configured to:
autonomously determine a desired configuration of the modules based on design criteria and a task; and
autonomously reconfigure the modules to the desired configuration by actuating and locking at least one joint of at least one of the modules without disconnecting adjacent modules; wherein the at least one processor and the memory are further configured to: receive the design criteria and the task from the user.

2. The manipulator system of claim 1, wherein autonomously determining the desired configuration comprises:
constructing a configuration manifold, the configuration manifold representing possible configurations of the modules;
discretizing the configuration manifold into a number of points;
clustering the number of points into attractive regions and repelling regions;
ranking the regions based on the design criteria;
determining a trajectory through the regions; and
translating points of the trajectory in the configuration manifold to the desired configuration.

3. The manipulator system of claim 1, wherein the at least one processor and the memory are further configured to:
simulate reconfiguration of at least one joint of the modules to the desired configuration; and
simulate execution of the task by the robotic reconfigurable manipulator in the desired configuration.

4. The manipulator system of claim 1, wherein the prismatic joint is configured to enable adjustment of the linear distance between adjacent modules and at least one of the revolute joints is configured to enable adjustment of the orientation between adjacent modules.

5. The manipulator system of claim 4, wherein the prismatic joint comprises at least one lead screw and at least one actuator.

6. The manipulator system of claim 4, wherein the at least one revolute joint comprises at least one motor and a harmonic transmission drive connected to the at least one motor.

7. The manipulator system of claim 6, wherein the at least one revolute joint further comprises at least one solenoid configured to engage teeth of a rotor of the at least one motor to lock revolute motion.

8. The manipulator system of claim 1, wherein the prismatic joint and the revolute joints have mutually perpendicular axis of motion.

9. The manipulator system of claim 1, wherein at least one of said modules further comprises at least one of:
- at least one sensor configured to detect linear motion;
- at least one sensor configured to detect revolute motion;
- at least one sensor configured to detect linear force; and
- at least one sensor configured to detect revolute torque.

10. The manipulator system of claim 1, wherein each of said modules comprises:
- at least one sensor configured to detect linear motion;
- at least one sensor configured to detect revolute motion;
- at least one sensor configured to detect linear force; and
- at least one sensor configured to detect revolute torque.

11. The manipulator system of claim 9, wherein the at least one sensor configured to detect linear motion comprises a potentiometer or a stepper motor associated with an encoder.

12. The manipulator system of claim 9, wherein the at least one sensor configured to detect revolute motion comprises a Hall-effect sensor mounted near a rotor of an actuator associated with a joint of the at least one module.

13. The manipulator system of claim 9, wherein the at least one sensor configured to detect linear force comprises a strain gauge associated with a cantilever beam.

14. The manipulator system of claim 9, wherein the at least one sensor configured to detect revolute torque comprises at least four strain gauges, each strain gauge associated with a beam of a cross of beams.

15. The manipulator system of claim 1, wherein each of said modules further comprises a coupler configured to connect to an adjacent module and configured to permit position adjustment between adjacent modules.

16. The manipulator system of claim 1, wherein the manipulator system is a serial robotic manipulator system.

* * * * *